United States Patent
Galan (10) Patent No.: US 8,275,886 B1
(45) Date of Patent: Sep. 25, 2012

(54) END-TO-END LUN MANAGEMENT VIA STANDARDS COMPLIANT MANAGEMENT INTERFACES

(75) Inventor: Antonio Galan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 783 days.

(21) Appl. No.: 12/144,559

(22) Filed: Jun. 23, 2008

(51) Int. Cl.
*G06F 15/173* (2006.01)

(52) U.S. Cl. .................... 709/226; 709/220; 714/6.2

(58) Field of Classification Search ............. 709/220, 709/226; 714/6.2
See application file for complete search history.

(56) References Cited

U.S. PATENT DOCUMENTS

| | | | |
|---|---|---|---|
| 6,839,746 B1 * | 1/2005 | Muthiyan et al. ............. | 709/220 |
| 6,920,494 B2 * | 7/2005 | Heitman et al. .............. | 709/223 |
| 7,194,538 B1 * | 3/2007 | Rabe et al. .................... | 709/224 |
| 7,409,495 B1 * | 8/2008 | Kekre et al. ................... | 711/114 |
| 2002/0103913 A1 * | 8/2002 | Tawil et al. ................... | 709/229 |
| 2003/0093509 A1 * | 5/2003 | Li et al. ......................... | 709/223 |
| 2005/0138316 A1 * | 6/2005 | Groves et al. ................. | 711/170 |
| 2007/0294563 A1 * | 12/2007 | Bose ............................... | 714/5 |
| 2008/0016311 A1 * | 1/2008 | Harada .......................... | 711/170 |
| 2008/0282321 A1 * | 11/2008 | Hecht et al. ...................... | 726/1 |

* cited by examiner

*Primary Examiner* — Thomas Dailey (74) *Attorney, Agent, or Firm* — Cooper Legal Group, LLC (57) ABSTRACT

A storage system to be used by a host is automatically configured using an agent running at a management console communicatively coupled to the host and to the storage system. In response to probes initiated by the agent, information regarding the host and the storage system, which information is required for the host and the storage system to establish a connection therebetween is obtained and is provided to the host and the storage system. Thereafter, the agent instructs the host and the storage system to establish the connection and further instructs the host to configure the storage system and, finally, to mount the storage system in some instances, the agent may use instruction compliant with the storage management initiative-specification (SMI-S) or, more generally, with the WBEM standard.

23 Claims, 5 Drawing Sheets

END-TO-END LUN MANAGEMENT VIA STANDARDS COMPLIANT MANAGEMENT INTERFACES

FIELD OF THE INVENTION

The present invention relates to methods and systems for automated configuration of storage systems.

BACKGROUND

As businesses grow, the need to manage storage solutions for data produced and used by those businesses increases at a staggering pace. Storage is much more than just a collection of disk drives or tapes, it is a critical resource and must be allocated and managed as such in order to provide real benefits for a business. Consequently, methods and systems that allow for the efficient management and allocation of storage are needed.

Understanding data storage requires a review of both the hardware components involved with storage solutions and the virtual environment which makes use of those resources. At the lowest level of the data storage hierarchy are the actual storage mediums. These are the disks and other mediums on which software programs (e.g., applications) and the data used by those programs reside, in the case of disks, the digital information that makes up the programs and data is stored in magnetic form on a spinning platter and is accessed (e.g., read and written) using sensitive magnetic heads that traverse the platter.

Because disks are subject to mechanical failure, and to offer performance benefits, it is often the case that a number of individual disks are combined into a group. Multiple ones of such groups of disks may be integrated into larger storage infrastructures to make the data stored on the disks available to multiple computer systems over local or wide area networks. So-called Redundant Arrays of Independent Disks (RAID) are one means of grouping disks together. RAID systems can be fashioned in a number of different ways, each of which offer different, advantages and drawbacks.

Connecting, the disks to the other portions of a computer system are interfaces. These interfaces conic in a variety of forms, including various types of serial and parallel interfaces. Popular interfaces include the Small Computer System Interface (SCSI) and Fibre Channel (FC). Each interface has an associated communications protocol for managing the information exchange between the storage device and the attached computer system.

While very small computer networks (i.e., networks that do not support many individual users) may be able to make due with storage devices that are directly connected to (or integrated within) a few hosts (e.g., servers), such solutions are not appropriate for large computer networks in which many users require access to data, instead, larger computer networks often rely on independent networks of storage devices called storage area networks (SANs), A SAN, which may implement a block-based protocol for storage organization, is typically a high performance network in which the individual storage devices (and the storage servers that utilize such devices) are interconnected with one another by high speed interfaces (such as FC interfaces or Internet SCSI (iSCSI) interfaces) through one or more switches. Thus, a SAN acts like a fabric of storage devices.

Each of the storage servers and storage devices within the SAN connects with other such devices through a host bus adapter (HBA), a processing unit that handles intra-SAN communications. HBAs can be fashioned as expansion cards or integrated circuits within storage devices or servers, HBAs of different storage servers and/or storage devices exchange information via a switch that handles and directs traffic between these devices.

Of course, operating a SAN involves more than simply connecting servers and storage devises to one another. The storage devices must be configured, allocated, tested and maintained. Software systems designed for such activities are called storage resource management (SRM) applications, and these applications provide centralized management of an entire SAN through a single management console.

Another form of storage device technology is called Network Attached Storage (NAS). NAS systems use file access protocols, such as, for example, Network File System (NFS) or Common Internet File System (CIFS) to retrieve data and manage data at the file level. NAS solutions are typically less expensive than SANs and allow storage devices to be connected to computer networks through conventional Ethernet connections and Internet Protocol (IP) addresses, NAS devices can also be connected to a SAN. Like SANs, NAS devices are managed and configured using software applications that run on management consoles.

SUMMARY OF THE INVENTION

LUN (logical unit number) management and provisioning performed in accordance with the present invention proceeds efficiently and without excessive delay. Compared with conventional approaches, administrative time once used to manually configure LUNs within a SAN (or other storage environment) may be applied to other tasks. Tasks that previously required human administrator labor are now automated.

In one embodiment consistent with the present invention, a storage system to be used by a host may be automatically configured using an agent running at a management console communicatively coupled to the host and to the storage system. In response to probes initiated by the agent, information regarding the host and the storage system, which information is required for the host and the storage system to establish a connection therebetween is obtained and is provided to the host and the storage system. Thereafter, the agent instructs the host and the storage system to establish the connection and further instructs the host to configure the storage system and, finally, to mount the storage system. In some instances, the agent may use instructions compliant with the storage management initiative-specification (SMI-S) or, more generally, compliant with the Web-Based Enterprise Management (WBEM) standard.

The information regarding the host may include host bus adapter (HBA) information, while the information regarding the storage system may include World Wide Node Name (WWNN) and World Wide Port Name (WWPN) information (for example, where the data storage system is a storage area network, in which case mounting the storage system may include mounting one or more LUNs). In other cases, the data storage system may be a network attached storage (NAS) system.

Other embodiments of the in provide methods, systems, and apparatus for managing data communication between a data storage system and a host. Information about a client and data storage system is received, the data storage system is configured using the client information and the data storage system information, and the data communication between the data storage system and the host is managed based on the configuration.

In some cases a host may be instructed to discover, partition, and/or mount a data volume, wherein the data volume may be a portion of the data stored in the data storage system. In some embodiments, the received client information and/or data storage information is cached. The received client, information may include fiber channel (FC) or iSCSI host bus adaptor (HBA) information.

In some embodiments, the data storage system and/or host may be monitored and a data volume may be mounted on a client. In still further embodiments, some or all resources using the data storage network may be managed using the same management console and the management console is a standalone entity.

In still further embodiments, the data storage system may be compliant with the storage management initiative-specification (SMI-S) data storage standard or, more generally, with the WBEM standard. The data storage network may be a storage area network (SAN). The SAN may include a logic unit number (LUN) and/or an iGroup. Additionally or alternatively, the data storage system may be network attached storage (NAS). In an alternate embodiment, health statistics for the data storage information from a client's or data storage system's perspective may be provided.

These and further examples of the present invention are discussed below.

BRIEF DESCRIPTION OF THE DRAWINGS

The present invention is illustrated by way of example, and not limitation, in the figures of the accompanying drawings in which.

DETAILED DESCRIPTION

Recognizing the shortcomings of conventional logical unit number (LUN) management tools, the present inventor has developed methods, systems, and apparatus for automated end-to-end LUN management, which methods, systems and apparatus are described in detail below. LUNs are typically created as part of a storage provisioning process using an SRM application, in one embodiment consistent with the present invention, a storage system (and, in particular LUNs within the storage system) is automatically configured using an agent (e.g., a software application) running on a management console communicatively coupled to a host and the storage system in response to probes initiated by the agent, information regarding the host and the storage system, which information is required for the host and the storage system to establish a connection therebetween, is obtained and is provided to the host and the storage system. Thereafter, the agent instructs the host and the storage system to establish the connection and further instructs the host to configure the storage system and, finally, to mount the storage system. In some instances, the agent may use instructions compliant with the storage management initiative-specification (SMI-S) or, more generally, compliant with the Web-Based Enterprise Management (WBEM) standard, as part of this process.

As noted above, whether for a SAN or NAS implementation, SRM applications are responsible for a variety of tasks, including configuration, migration, provisioning, archiving, and monitoring/reporting. Configuration, as the name implies, deals with the set-up of storage resources like storage servers and storage devices. For example, configuration applications may organize and manage RAID groups. Provisioning applications are used to define and control access to storage resources, while migration and archiving applications may be used to move data between different storage systems or devices.

While the raw physical disk space in a storage system may be found as part of a SAN or NAS implementation, it can only be accessed by other computer resources through virtual representations of that disk space. That is, while disks are the foundation of any storage system, computer software cannot make use of these physical disks directly. The platters, heads and other characteristics of a physical disk drive must be translated into a virtual construct that a software application can recognize. Hence, storage networks such as SANS and NAS must have their physical disks partitioned into logical entities so that other computer systems (called "hosts") can access the storage provided by the disks. Each such logical portion is called a logical unit number (LUN).

LUNs are typically created as part of a storage provisioning process using an SRM application. As part of such a process, a single disk (or RAID group) may be partitioned into multiple LUNs, or a single LUN may be created to span multiple physical disks (or groups) Multiple LUNs may be collected into a larger virtual unit called a "volume". Once created, LUNs can be shared between multiple hosts through an appropriate storage operating system. Since large storage systems may include thousands of LUNs, it becomes critical for enterprises to have available efficient means for LUN creation, manipulation and reporting.

Unfortunately, however, the software tools presently available for LUN configuration and management require significant manual input. That is, few autmated LUN management applications are available, in today's modern enterprise networks, where a single storage system may host more than 10,000 LUNs, the use of such limited management tools means that administrators may spend many hours configuring LUNs Accordingly, what is needed is improved means for automated configuration and management of LUNs.

Unlike conventional approaches. LUN management and provisioning performed in accordance with the present invention proceeds efficiently and without excessive delay. Compared with conventional approaches, administrative time once used to manually configure LUNs within a SAN (or other storage environment) may be applied to other tasks. Before presenting the details of the present invention, however, the reader is reminded that in the following description, for purposes of explanation, numerous specific details have set forth in order to provide a thorough understanding of the present invention. It will be evident, however, to one skilled in the art that the present invention may be practiced without these specific details. Therefore, the invention is not intended to be limited by the illustrated embodiments presented herein and should only be measured in terms of the claims following this description.

For purposes of this discussion, the terms "storage system" will be used to refer to a computer that provides storage service relating to the organization of information on writeable persistent storage devices, such as memories, tapes or disks. As indicated above, such storage systems are typically implemented as one or more volumes, made up of a number of physical storage disks and defining an overall logical arrangement of storage space. Each volume may generally be associated with its own file system. An operating system of the storage system enables access to stored information using block-based access protocols over communication networks, such as Fibre Channel (FC) or Ethernet, adapted to operate with block access protocols, such as Small Computer Systems Interface (SCSI) protocol encapsulation over FC (FCP) or TCP/IP/Ethernet (iSCSI).

For ease of explanation, much of the present discussion will reference SAN environments. However, the present invention is equally applicable to other storage environments, such as NAS or directly connected storage devices. Therefore, the invention should not be regarded as being limited to use within SANs.

In SCSI terminology, hosts operating in a SAN environment are regarded as initiators that initiate requests and commands for data. Individual storage devices are thus targets configured to respond to the requests issued by the initiators in accordance with a request/response protocol. According to the FC protocol, initiators and targets have three unique identifiers, a Node Name, a Port Name and a Device Identifier. The Node Name and Port Name are worldwide unique, e.g., World Wide Node Name (WWNN) and World Wide Port Name (WWPN). Individual Device identifiers are unique within a given FC switching fabric. In a SAN, a WWPN performs a function equivalent to a media access control (MAC) address in the Ethernet, protocol.

Storage devices can share their storage resources over a SAN using several different techniques. For example, storage resources can be shared using storage controllers that perform storage virtualization. This technique can make one or more physical storage devices, such as disks, which are made up of a number of LUNs, appear as a single virtual logical unit or multiple virtual logical units ("VLUNs"). By hiding the details of the numerous physical storage devices, a storage virtualization system having one or more controllers advantageously simplifies storage management between a host and the storage devices. In particular, the technique enables centralized management and maintenance of the storage devices without involvement from the host.

Before such centralized management is possible, however, the individual storage systems must each be separately configured. As discussed above, such configuration may generally involve creating a volume, creating one or more LUNs on the volume, mapping those LUNs to one or more initiator groups (iGroups) to make the LUNs available to initiators in those groups, and, possibly, creating a zone within the switching fabric for the storage system (the SAN must generally be configured into zones so that physical disks and their LUNs are available to the appropriate hosts). Likewise, some configuration will be required on the host side. This may involve configuring, the host for LUN discovery, possibly mapping the LUNs to one or more partitions (so that the host will see each partition as a separate LUN) and mounting the file system on the host. Other storage provisioning requirements may include mapping of specific array ports and masking specific host bus adapters (HBAs).

Figure 1:
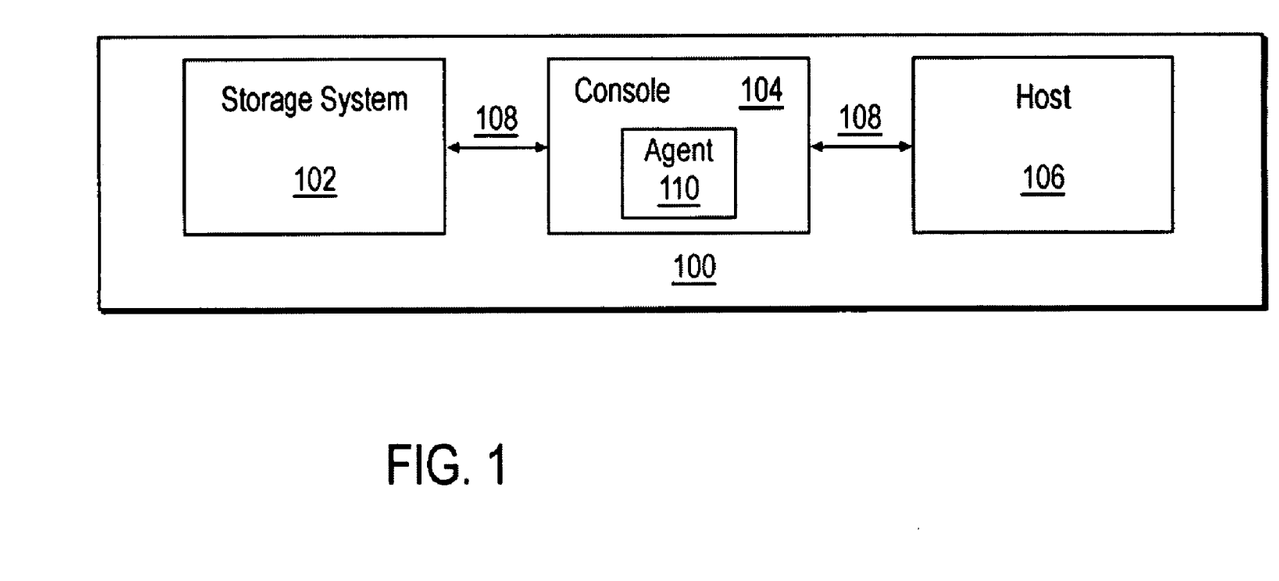
FIG. 1 is a simplified illustration of a network including a storage system, within which network embodiments of the present invention ma be used.

With the above in mind, refer to the simplified storage environment 100, shown in FIG. 1. Environment 100 is adapted for managing data communication between a storage system 102 and a host 106 via a management console 104. The components of storage environment 100 are communicatively coupled to one another via a plurality of communication links 108. Storage system 102 may be any system suitable for storing data, such as components of a storage area network (SAN) or network attached storage (NAS) system. In one embodiment of the invention, storage system 102 is compliant with the storage management initiative-specification (SMI-S) data storage standard or, more generally, with the Web-Based Enterprise Management (WBEM) standard, a set of management and Internet standard technologies developed to unify the management of distributed computing environments. SMI-S is a subset of WBEM.

Management console 104 is configured with an agent 110 (e.g., a software application) that stores information regarding the volumes of storage system 102. In the example of a SAN, management console 104 is configured (e.g., through the use of appropriate storage management software) to include information regarding not only volumes, but also LUNs and/or iGroups associated with storage system 102.

The agent 110 resident at management console 104 is also configured to store information regarding host 106. Such information may include FC or iSCSI HBA information. Host 106 may also be compliant with SMI-S.

Figure 2:
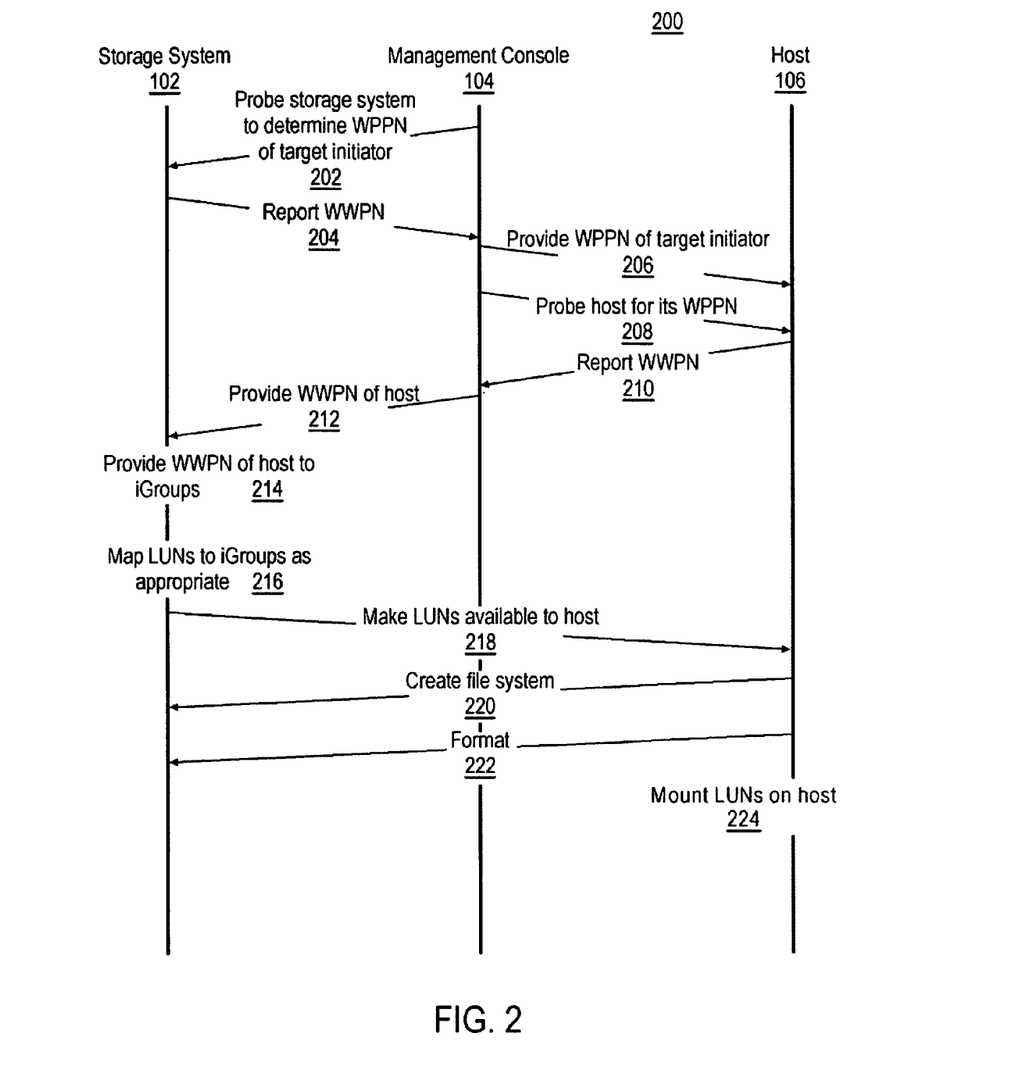
FIG. 2 illustrates a procedure for automatically configuring a storage system in accordance with an embodiment of the present invention.

FIG. 2 illustrates process 200 for automatically configuring a storage system in accordance with an embodiment of the present invention. Process 200 may be performed by a single entity, such as agent 110 running on management console 104. At operation 102, the management console probes the storage system for information required for the automated configuration process. In this context, probing means that the management console sends a request to the storage system (or the host, as discussed below) seeking specified identity information from the storage system. Having this process performed by an automated routine relieves human operators from having to format and initiate such requests, thus providing efficiency over conventional configuration processes.

As noted above, devices attached to an FC network have a unique WWNN and one or more associated ports, each of which has a unique World Wide Port Name (WWPN). Each device is, thus, uniquely identified by a WWNN and one or more WWPNs. Thus, in some cases, the requests from the management console may resemble, at least in part, fabric log-in (FLOGI) requests that area used as part of a FLOGI protocol for registering a device within a FC network and, in response, WWNN/WWPN information may be returned to the management console at operation 104.

In other embodiments of the invention, for example when used within a NAS environment, the storage system may be embodied as a file server (or filer) including an operating system that implements a file system to logically organize information as a hierarchical structure of data containers (e.g. directories and files) on storage media (e.g., disks). Each such data container may be implemented as a set of data structures (e.g., disk blocks) configured to store information (such as the actual data for a subject file) and some data containers (e.g., directories) may store information about other data containers. Each data container stored in a filer is typically identified by a "handle" that includes a volume identifier (which indicates which storage volume in the filer contains the subject data container), a data container identifier (which, for example, identities the specific file or directory in the volume), and a generation number (which identities a particular instance of the subject data container in the volume). Collectively these parameters describe a specific data container in the filer and so in such an implementation this may be the information returned to the management console in response to the probe.

Returning to the embodiment illustrated in FIG. 2, the information needed for the host to be able to contact the storage system (e.g., the WWNN/WWPN information in the case of a SAN implementation or the handle in the case of a NAS implementation) is provided to the host at operation 206. Thereafter, the agent running on the management console probes the host for reciprocal information needed by the storage system in order to facilitate communication with the host (operation 208). The requested information is returned by the host at operation 210, and is provided to the storage system at operation 212.

In a SAN implementation, the information may include the WWNN of the host (i.e., the client application running on the host) and the WWPN of the host's HBA. In a NAS environment, the information may include an IP address of the host's HBA. In each case, the agent at the management console stores the information from both devices, as discussed above.

Once the storage system has been provided with the information needed to establish a connection with the host, the storage system may create iGroups, provide the host information to those iGroups as appropriate (operation 214) and map one or more LUNs to the iGroups (operation 216), all in the conventional fashion. Thereafter, those LUNs are advertised or otherwise made available to the host (operation 218).

Although shown as autonomous operations in the illustration, it should be recognized that in some embodiments of the invention the actions of the storage system and the host take place in response to appropriate commands from the agent running on the management console. These commands may be passed as SMI-S commands over an appropriate interface, and in some cases may be in response to administrator input at the management console. For example, the administrator ma be prompted to enter information regarding the number of LUNs to configure, how to partition the LUNs, or other information. Nevertheless, the administrator is relieved from the task of having to obtain and provide all of the connectivity information concerning the host and the storage system and need not provide specific instructions concerning the sequence of the operations to be performed. Therefore, the process of configuring the storage system is streamlined.

Once the LUNs have been made available to the host, the host may create an appropriate file system on the storage system (operation 220). The file system will specify the logical, and perhaps hierarchical, organization of information stored on the physical media of the storage system. Thereafter, the host may format the storage system (operation 222) and finally mount the LUNs (operation 224). Mounting is the process by which the LUNs are made available to applications running on the host so that those applications can store data to and retrieve data from the storage system. Again, these processes may be initiated in response to SMI-S commands from the agent running on the management console and the administrator is relieved from having to perform these operation manually.

Figure 3:
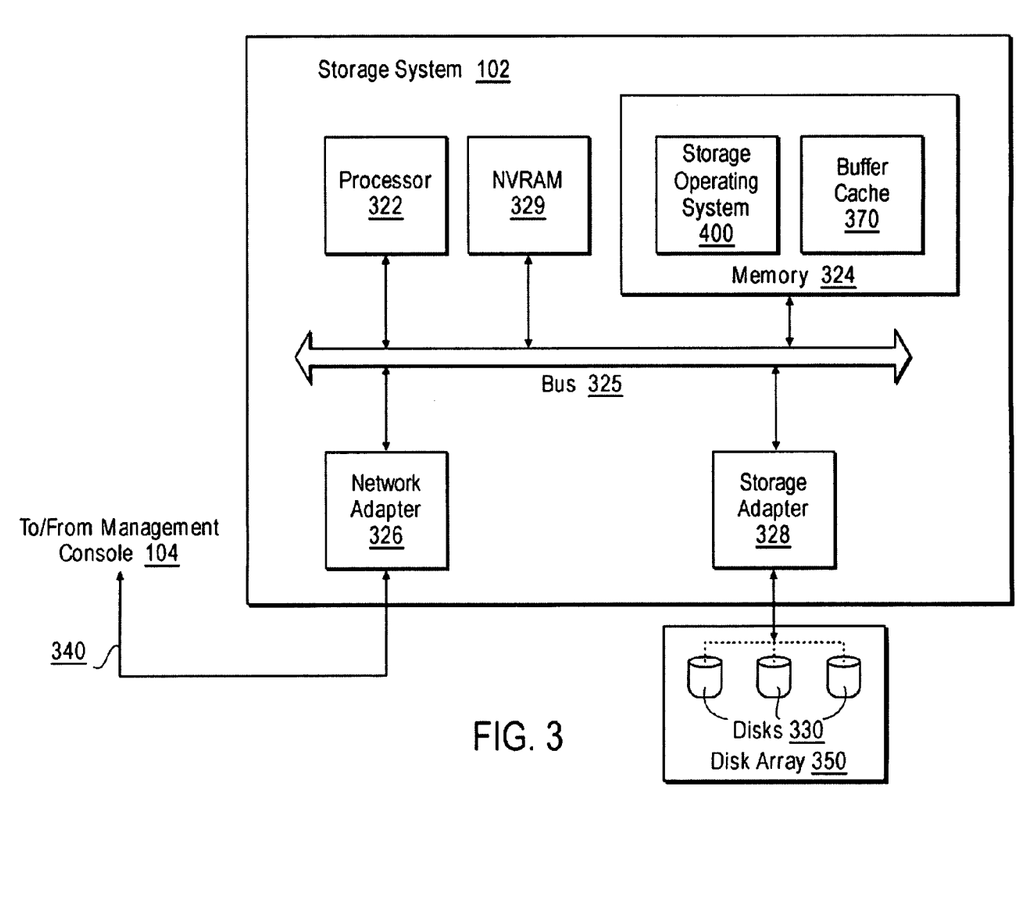
FIG. 3 illustrates a schematic block diagram of an exemplary storage system environment that may be advantageously used with the present invention.

An example of a storage system 102 configured in accordance with an embodiment of the present invention is shown in FIG. 3. Storage system 102 is a computer system that provides storage service relating to the organization of information on storage devices, such as disks 330 of a disk array 350. The storage system 102 includes a processor 322, a memory 324, a network adapter 326, a non-volatile random access memory (NVRAM) 329 and a storage adapter 328 interconnected by a system bus 325. The storage system 320 also includes a storage operating system 400 (described in greater detail below with reference to FIG. 4) that preferably implements a high-level organizational system, such as a file system, to logically organize information as a hierarchical structure of data containers (e.g., directories, files, etc.) on the disks 330. Note, in some cases, storage media other than or in addition to disks 330 may be used In this example, memory 324 is made up of storage locations that are addressable by the processor and adapted for storing software program code. A portion of the memory may be further organized as a buffer cache 370 for storing temporary data structures. Additionally, the NVRAM 329 may be utilized for temporary processing results.

The processor, storage adapter and network adapter may, in turn, include processing elements and/or logic circuitry configured to execute the software code and manipulate the various data structures in support of the methods of the present invention. Storage operating system 400, portions of which are typically resident in memory and executed by the processing elements, functionally organizes the storage system 102.

The network adapter 326 includes the mechanical, electrical and signaling circuitry needed to connect the storage system 102 to the management console 104 over a computer network 340, which may be a point-to-point connection or a shared medium, such as a local area network. Illustratively, this computer network may be embodied as an Ethernet or other network. The storage adapter 328 cooperates with the storage operating system 400 executing on the storage system 102 to read/write information from/to the storage media (e.g., disks 330). The information may be stored on any type of attached array of writable storage media such as video tape, optical, DVD, magnetic tape, bubble memory, electronic random access memory, micro-electro mechanical and any other similar media adapted to store information. However, as illustratively described herein, the information is preferably stored on the disks 330, such as hard disk drives (HDD) and/or direct access storage device (DASD), of disk array 350. As mentioned above, these disks 330 may be organized as one or more storage volumes, each of which may be associated with its own file system.

Figure 4:
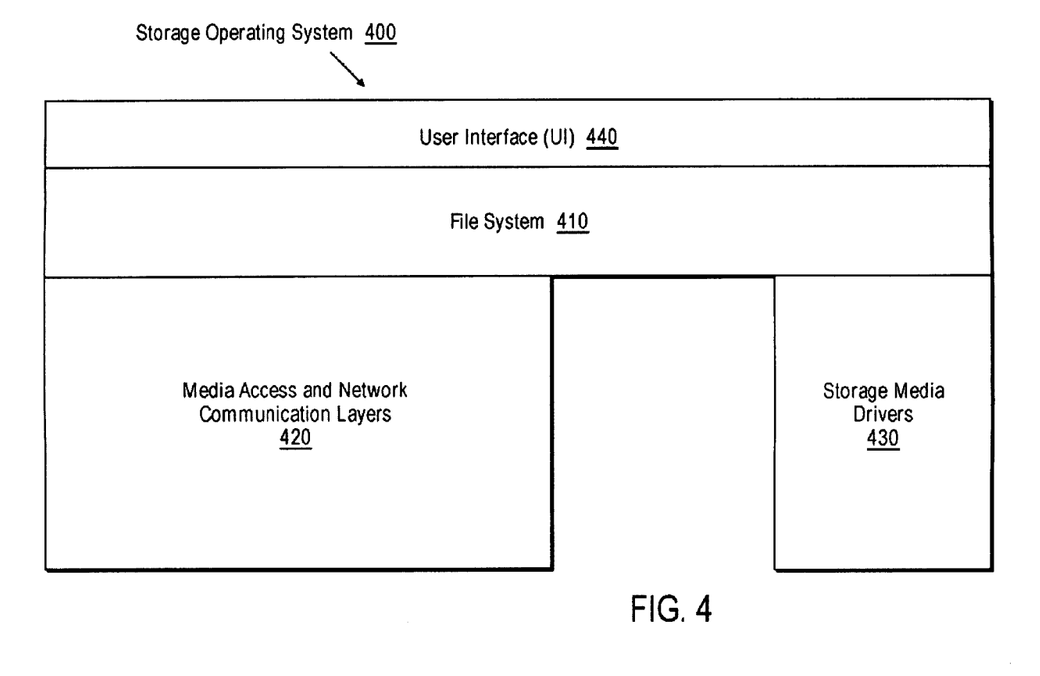
FIG. 4 is a schematic block diagram of an exemplary storage operating system of the storage system shown in FIG. 3.

To facilitate access to the disks 330, the storage operating system 400, shown in greater detail in FIG. 4, implements a file system 410 that virtualizes the storage space provided by disks 330. That is, the file system 410 logically organizes information as a hierarchical structure of named data containers (e.g., directories, files, etc.) on the disks 330. In this context, directories are data containers specially formatted to contain names and links to other data containers. In one embodiment, the storage operating system 400 is the NetApp® Data ONTAP® operating system available from NetApp, Inc, Sunnyvale, Calif., however, it is expressly contemplated that any appropriate storage operating system may be used in accordance with the principles described herein.

In addition to the file system 410, storage operating system 400 includes a series of software layers organized to form an integrated network protocol stack or, more generally, a multi-protocol engine that provides data paths for clients (such as host 106) to access information stored on the storage system. For the most part, these protocol layers will not be described in detail herein so as not to unnecessarily obscure the present invention. For example, a variety of media access and network communication layers 420 provide communications between the file system 410 and the network adapter(s) 326. Also, various storage media drivers 430 provide communication between the file system 410 and the storage media, such as disks 330. The precise details of these layers is not critical to the present invention.

Operationally, a request from the host 106 is forwarded over the computer network 340 to the storage system 102, where it is received at the network adapter 326. An appropriate (depending on the communication protocol used by network 340) module of media access and network communication layer 420 processes the request and, if appropriate, passes it up through the network protocol stack for additional processing prior to forwarding the request to file system 410. In response, the file system 410 generates operations to load (retrieve) the requested information from the storage media (e.g., disks 330) if that data is not already resident in memory 324 (e.g., in the buffer cache 370). The storage media drivers 430 accesses the information from the specified disk(s) and load the requested data in buffer cache 370 for processing by the storage system 320. Upon completion of the request, the storage system (and storage operating system) returns a reply to the client 310 over the network 340.

File system 410 bridges the media access and other network protocol stack layers to provide a virtualized representation of the storage media and the network interfaces to/from the storage system 102. The file system 410 may be accessed through various interfaces, such as a user interface (UI) 440, which provide administrative access from management console 104 (and agent 110) to the storage operating system. As mentioned, the file system 410 provides logical volume management capabilities for use in connection with accesses to the information stored on the storage devices, such as disks 330. Thus, the file system 410 is responsible for (i) aggregation of the storage media, (ii) aggregation of storage bandwidth of the storage media, and (iii) reliability guarantees associated with the storing of information to those storage media.

It should be noted that the software "path" through the storage operating system layers described above may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 102 in response to a request issued by host 106. Moreover, in another alternate embodiment of the invention, the processing elements of adapters 326, 328 may be configured to offload some or all of the packet processing and storage access operations, respectively, from processor 322, to thereby increase the performance of the storage service provided by the system. It is expressly contemplated that the various processes, architectures and procedures described herein can be implemented in hardware, firmware or software.

Figure 5:
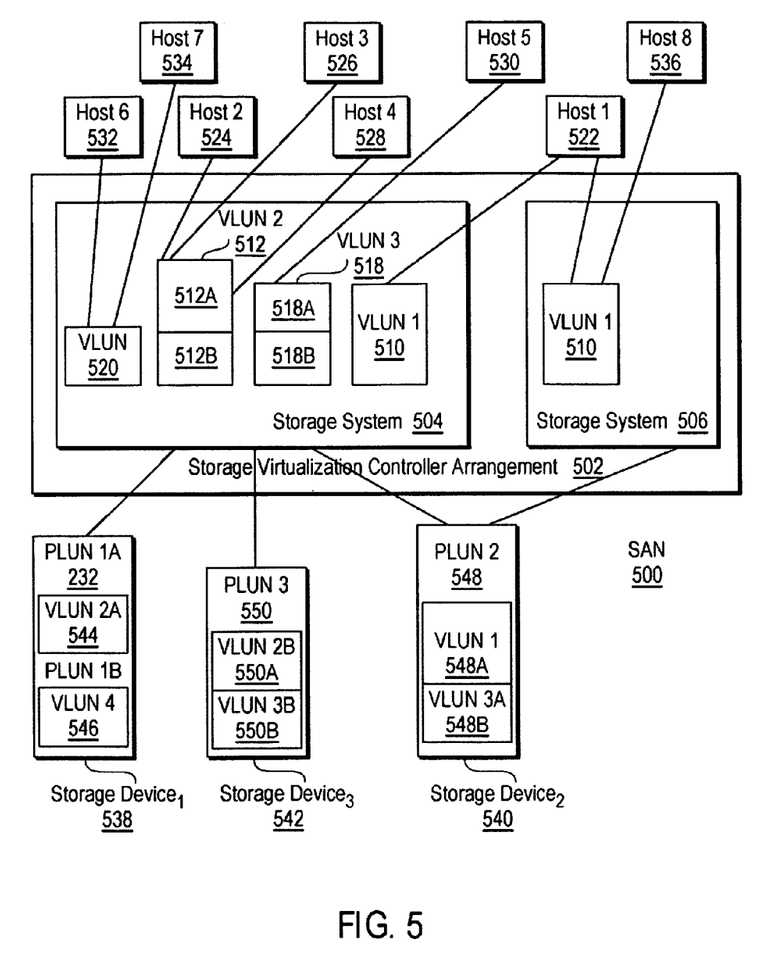
FIG. 5 illustrates a SAN having a storage virtualization system configured through automated processes in accordance with an embodiment of the present invention.

Referring now to FIG. 5, an example of the virtualization of storage made possible by the automated LUN management processes of the present invention is illustrated within the context of an exemplary SAN 500. SAN 500 includes a storage virtualization controller arrangement 502, made up of two storage systems 504, 506 interconnected via a communication link 508. Storage system 504 has been configured to provide four VLUNs 510, 512, 518, 520 associated with hosts 522-534, while storage system 506 has been configured to provide one virtual logical unit 510 associated with hosts 522 and 536. In the general case, a VLUN includes data from M physical storage devices, where the data corresponds to a range of data blocks.

In operation, one or more of the hosts each request access to a \LUN having a particular number of bytes of data using storage devices substantially matching characteristics described in a storage profile. Each host 522-536 accesses it's associated VLUN by sending commands to storage system 504 or storage system 506 to read and write virtual data blocks in the VLUN. In accordance with one implementation, storage system 504 associates $host_1$ 522 with $VLUN_1$ 510; associates $host_2$ 524, $host_3$ 526, and $host_1$ 528 with $VLUN_2$ 512; associates $host_5$ 530 with $VLUN_3$ 518, and associates $host_7$ 534 and $host_6$ 532 with $VLUN_4$ 520. In addition, storage system 506 associates $host_1$ 522 and $host_8$ 536 with $VLUN_1$ 510. It can be seen that $host_1$ 522 can access $VLUN_1$ 510 through two separate paths, one through storage system 504 and one path through storage system 506.

Storage virtualization controller arrangement 502 has been configured to map the virtual data blocks to physical data blocks on individual ones of the storage devices 538, 540, 542, according to one or more provisioning operations consistent with implementations of the present invention. Once provisioned, virtualization controller arrangement 502 communicates the commands and transfers the data blocks to and from the appropriate ones of the storage devices. Each storage device can include one or more physical LUNs; for example, storage $device_1$ 538 has two physical LUNs, $PLUM_{1A}$ 544 and $PLUN_{1B}$ 546, storage $device_2$ 540 has one physical LUN, $PLUN_2$ 548, and storage $device_3$ 542 has one physical LUN, $PLUN_3$ 550.

To illustrate further the mapping of virtual data blocks to physical data blocks, all the virtual data blocks of $VLUN_1$ 510 are mapped to a portion 548a of the physical data blocks $PLUN_2$ 548 of storage $device_2$ 548. Since $VLUN_2$ 512 requires more physical data blocks than any individual storage device has available, one portion 512a of $VLUN_2$ 512 is mapped to the physical data blocks of $PLUN_{1A}$ 544 of storage device 538, and the remaining portion 512b of $VLUN_2$ 512 is mapped to a portion 550a of the physical data blocks of $PLUN_3$ 550 of storage $device_s$ 542. One portion 518a of $VLUN_3$ 518 is mapped to a portion 548h of $PLUN_2$ 548 of storage $device_2$ 540, and the other portion 518b of $VLUN_3$ 518 is mapped to a portion 550b of $PLUN_3$ 550 of storage $device_3$ 542 can be seen with regard to $VLUN_3$ that such a mapping arrangement allows data block fragments of various storage devices to be grouped together into a VLUN, thus advantageously maximizing utilization of the physical data blocks of the storage devices. An the data blocks of $VLUN_4$ 520 are mapped to $PLUN_{1B}$ 546 of storage $device_1$ 538.

While the above-described exemplary mapping illustrates the concatenation of data block segments on multiple storage devices into a single VLUN, it should be noted that other mapping schemes, including but not limited to striping and replication, can also be utilized by the storage virtualization controller arrangement 502 to form a VLUN. Additionally, the storage devices may be heterogeneous; that is, they may be from different manufacturers or of different models, and may have different, storage sizes, capabilities, architectures, and the like. Similarly, the hosts may also be heterogeneous; they may be from different manufacturers or of different models, and may have different processors, operating systems, networking software, applications software, capabilities, architectures, and the like.

Thus, methods, systems, and apparatus for automated end-to-end LUN management have been described. Although discussed above with reference to certain illustrated embodiments, the invention is not intended to be limited thereby and should only be measured in terms of the claims following this description.

What is claimed is:

1. A method for automatically configuring a storage system, comprising:
   receiving, at a management console communicatively coupled to a host and the storage system, information regarding the host and the storage system from one or more probes initiated by an agent executing on the management console, the information is used for the host and the storage system to establish a connection therebetween;

providing, via the agent, the host and the storage system with the information;

instructing, via the agent, the host and the storage system to establish the connection therebetween using the information;

instructing, via the agent, the storage system to perform logical unit number (LUN) configuration comprising creating an iGroup; and instructing, via the agent, the host to configure the storage system using the connection, via at least one of: instructing the host to mount the storage system on the host, instructing the host to configure volume data on the storage system, or instructing the host to configure LUN data on the storage system.

2. The method of claim 1, the probes comprising communications compliant with at least one of a Web-Based Enterprise Management (WBEM) standard or a storage management initiative-specification (SMI-S).

3. The method of claim 1, the LUN configuration comprising at least one of: mapping one or more LUNs to the iGroup or exposing one or more LUNs to the host.

4. The method of claim 1, the information regarding the host comprising host bus adapter (HBA) information.

5. The method of claim 1, the information regarding the storage system comprising at least one of World Wide Node Name (WWNN) information or World Wide Port Name (WWPN) information.

6. The method of claim 1, comprising instructing, via the agent, based upon the LUN configuration, the host to at least one of: create a file system on the storage system, format the storage system, or mount one or more LUNs of the storage system on the host.

7. The method of claim 1, the instructing the host to mount the storage system on the host comprising mounting one or more LUNs.

8. The method of claim 1, the storage system comprising a network attached storage (NAS) system.

9. A system, comprising a management console communicatively coupled to a host, including a processor and a memory, and to a storage system to be used by the host, the management console comprising an agent configured to:

communicate with the host and the storage system to obtain information regarding the host and the storage system used for the host and the storage system to establish a connection therebetween;

provide the host and the storage system with the information;

instruct the host and the storage system to establish the connection therebetween using the information;

instruct the storage system to perform logical unit number (LUN) configuration comprising creating an iGroup; and instruct the host to configure the storage system using the connection, via at least one of: instructing the host to mount the storage system on the host, instructing the host to configure volume data on the storage system, or instructing the host to configure data on the storage system, the management console comprising a second processor.

10. The system of claim 9, the agent configured to communicate with the host and the storage system using communications compliant with a Web-Based Enterprise Management (WBEM) standard.

11. The system of claim 10, the agent configured to communicate with the host and the storage system using storage management initiative-specification (SMI-S) compliant communications.

12. The system of claim 9, the information regarding the host comprising host bus adapter (HBA) information.

13. The system of claim 9, the information regarding the storage system comprising at least one of World Wide Node Name (WWNN) information or World Wide Port Name (WWPN) information.

14. The system of claim 9, the storage system comprising a storage area network (SAN).

15. The system of claim 9, the agent configured to instruct the host to mount one or more LUNs associated with the storage system.

16. The system of claim 9, the storage system comprising a network attached storage (NAS) system.

17. A method for automatically configuring a virtual storage arrangement within a computer network, comprising:

receiving, at a management console communicatively coupled to a host and a storage system, information regarding the host and the storage system from one or more probes initiated by an agent executing on the management console, the information is used for the host and the storage system to establish a connection therebetween;

providing, via the agent, the host and the storage system with the information;

instructing, via the agent, the host and the storage system to establish the connection therebetween using the information;

instructing, via the agent, the storage system to perform logical unit number (LUN) configuration comprising creating an iGroup; and instructing, via the agent, the host to mount one or more associated with the storage system on the host.

18. The method of claim 17, the storage system communicatively coupled to a storage device comprising one or more physical LUNs (PLUNs).

19. The method of claim 18, the one or more LUNs comprising one or more virtual LUNs (VLUNs) mapped to one or more of the PLUNs.

20. The method of claim 19, the probes comprising communications compliant with a Web-Based Enterprise Management (WBEM) standard.

21. The method of claim 20, the probes comprising communications compliant with a storage management initiative-specification (SMI-S).

22. The method of claim 20, the information regarding the host comprising host bus adapter (HBA) information.

23. The method of claim 20, the information regarding the storage system comprising at least one of World Wide Node Name (WWNN) information or World Wide Port Name (WWPN) information.

* * * * *